Figure 1:
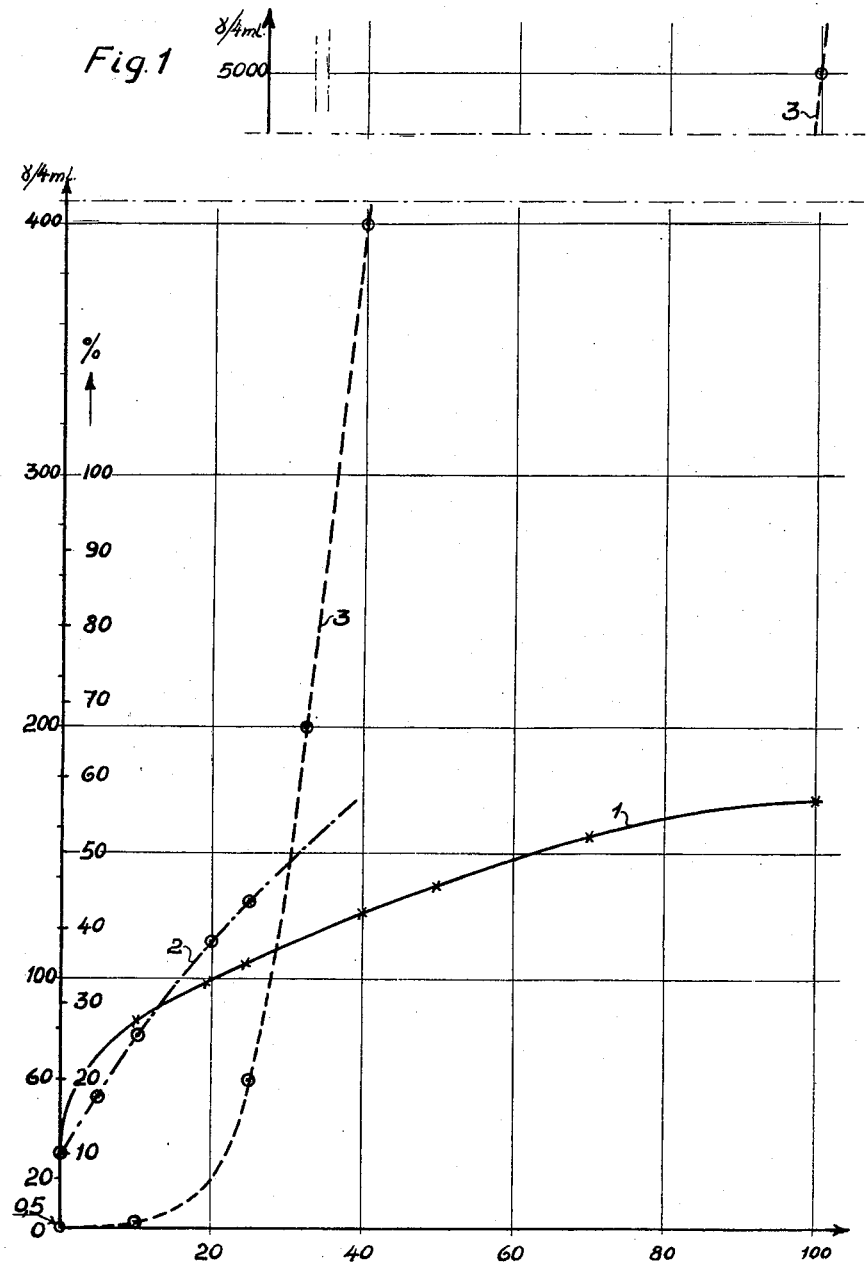

3,008,951
ANTI-ENZYMATIC SUBSTANCES
Ove Birger Fernö, Hans Jakob Fex, and Torsten Ove Enok Linderot, Halsingborg, Sweden, and Ernst Thomas Rosenberg, Orholm pr. Lyngby, Denmark, and Knut Bertil Högberg, Halsingborg, Sweden, assignors to Aktiebolaget Leo, Halsingborg, Sweden, a firm
Filed June 17, 1953, Ser. No. 362,312
Claims priority, application Sweden June 17, 1952
7 Claims. (Cl. 260—206)

The present invention relates to substances with anti-enzymatic properties, particularly in relation to hyaluronidase, as well as to a method for the production of such substances.

Earlier investigations by applicant have shown that by phosphorylating di- and polyhydroxy flavones or flavanones or di- or polyhydroxy chalcones or their dihydro derivatives corresponding to the said dihydroxy- or polyhydroxy flavanones under suitable conditions more or less high molecular compounds are obtained which are formed as a result of a condensation-polymerization. The charge of the thus formed compounds is strongly negative and the compounds are—at least by neutral or alkaline reaction—soluble in water. They are characterized by having an anti-enzymatic effect on certain enzymes, particularly hyaluronidase. Some of the said starting materials have the said effect even when not phosphorylated, but by the said polymerization products the effect is strongly increased as compared with the corresponding starting material.

J. M. Beiler and G. J. Martins (Journal of Biol. Chem., 174, 31 (1948)) have formerly shown that the introduction of phosphoric acid and sulphuric acid groups may in some cases increase the effect of anti-enzymatic substances. Thus by phosphorylating hesperidin an increase of the restraining action of this substance on hyaluronidase is found. A great surplus of phosphorus oxychloride is used by the phosphorylation and no condensation-polymerization products are formed with phosphoric acid. The obtained increase in the effect is, therefore, also many times less than that which can be obtained by means of the above substances to which hesperidin is related.

It has now been found that a strongly anti-enzymatic effect, particularly against hyaluronidase, is found also by polymer condensation products of phosphoric acid or thiophosphoric acid with one or more aromatic or aromatic-aliphatic compounds containing three or more core-bound OH, SH or NH groups or two such groups, which are either bound to different nuclei or are in meta- or para-position to each other on the same nucleus, when the condensation products contain free hydroxylic groups bound to phosphorus atoms and have a molecular height exceeding 2000, but on the other hand not so high as to prevent the compounds from being soluble in aqueous solutions of alkali even if the said compounds, which in the following are named primary compounds, are not hydroxy derivatives of flavones, flavanones or the chalcones and their dihydro derivatives corresponding to flavanones.

The kind and chemical structure of the primary substances are thus without importance if only the above few conditions are fulfilled. The practical limit for applying the present invention thus only depends on the possibilities of procuring suitable primary substances.

The conditions to be fulfilled by the primary substance coincide fully or partly with the conditions which determine the formation of condensation-polymerization products with phosphoric acid or thiophosphoric acid having a suitable stability and a molecular weight within the said limits, and which products consist of phosphoric acid or thiophosphoric acids being condensed to branched or straight chains through organic radicals. This necessitates that the primary substance has at least two OH, SH or NH groups which are able to react with phosphoric acid or thiophosphoric acid since no inter-connection of the phosphoric acid groups by means of the organic substance can take place without the latter being able to bind at least two phosphoric acid groups. On the other hand such interconnection is not prevented by the primary substance having, if desired, more than two of the said reactive groups. That the latter have to be bound to the nucleus of an aromatic compound seems to be a consequence of the specific character of the aromatic bond. If the primary substance has only two of the said reactive groups they should not be in ortho-position to each other since in this case the condensation products are not sufficiently stable within the said range of the molecular weight. If, however, the primary substance contains more than two of such reactive groups it does not matter if two of them are in ortho position to each other. Suitable anti-enzymatic substances are also obtained according to the invention by using primary substances in which the reactive groups involved in the condensation are found at different nuclei.

Furthermore, however, it is suitable among primary substances having several aromatic nuclei, to use such in which the said aromatic nuclei are interconnected by a bridge consisting of not more than two atoms of the group consisting of C, O, N and S. This limits the distance between the points in the molecule where condensation with the phosphoric acid or thiophosphoric acid may take place.

In accordance herewith an anti-enzymatic substance according to the invention expediently consists of phosphoric acids or thiophosphoric acids interconnected by means of organic radicals to branched or straight chains provided that the phosphorus atoms of said acids are all through oxygen, sulphur or nitrogen connected to one, two or three groups of the type Z, where Z represents identical or different mono- or poly-nuclear, if desired aliphatic substituted, aromatic radicals or radicals in which several aromatic nuclei are connected by a bridge consisting of not more than two atoms from the group consisting of C, O, N and S. Further it is a condition that the substance shall contain free hydroxyl groups connected to phosphorus and have a molecular weight within the above limits. To illustrate the possibilities of the structural shape of such products, the product obtained by phosphorylating hydroquinone or resorcinol may be mentioned. This product consists mainly of chains of the type:

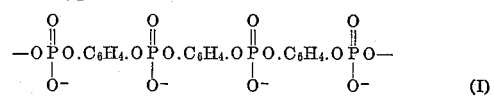
(I)

In these chains, however, the third valency of the phosphorus atoms, which in the shown formula is occupied by free hydroxyl groups which are dissociated since the substances are dissolved, may in some cases be linked to hydroquinone or resorcinol, whereby the chains will be branched.

By using a primary substance containing more than two groups able to react with phosphoric acid or thiophosphoric acid, more complicated structures will be possible an example of which is shown in Formula II:

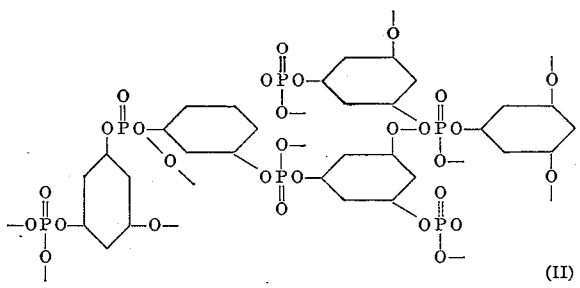

In this formula it is taken for granted that only two of the valencies of the phosphorus atoms are connected to the primary substance, whereas the picture becomes still more complicated if some of the third valencies of the phosphorus are also used in the connections. When primary substances with four, five or more reactive groups are used, the number of possible structures will of course be practically unlimited and it is not possible in this manner to obtain an even approximately correct picture of the structure of the products.

This structure, however, is sufficiently determined by the definitions given above.

The simplest primary substance which can be used according to the present invention is benzene which is substituted with two of the reactive groups OH, SH and NH, which are not in ortho-position to each other. As examples of primary substances of this kind there may be mentioned hydroquinone, resorcinol, p-phenylendiamine, m-phenylendiamine, thiohydroquinone, thioresorcinol, p-aminophenol, m-aminophenol, p-aminothiophenol, m-amino-thiophenol, p- and m-N-methylaminophenol, p- and m-N-alkylaminophenols, where the alkyl group may be of any suitable length, for instance butyl, dodecyl or octadecyl, or may be substituted with an alicyclic radical, for instance cyclohexyl, or the corresponding thiophenols.

In addition to the two reactive groups other substituents may also be present in the benzene nucleus such as alkyl groups, for instance methyl-, butyl-, hexyl-, cyclohexyl-, dodecyl- or octadecyl groups or nitro groups, halogens, for instance chlorine or bromine, carboxyl groups, sulphonic acid groups, keto groups where the carbonyl groups may be in α-position, for instance acetyl. In the latter case, however, such acetyl substituted phenols are excepted in which the acetyl groups are in o-position to an OH group, since the latter is partly inactivated thereby.

However, it is even better to use as a primary substance benzene substituted with more than two of the above mentioned reactive groups, and it is then without importance whether the said groups are in a vicinal, symmetric or unsymmetric position. As examples of primary substances of this kind there may be mentioned phloroglucinol, pyrogallol and hydroxyhydroquinone, symmetrical aminoresorcinol, vicinal amino-resorcinol and corresponding thiophenols and further diaminophenols and diaminothiophenols.

Just as the benzene derivatives with two reactive groups the latter benzene derivatives may be further substituted at the nucleus with for instance alkyl groups, such as methyl, butyl, hexyl, cyclohexyl, dodecyl or octadecyl groups or nitro groups, halogens, for instance chlorine or bromine, carboxyl groups, sulphonic acid groups, keto groups, where the carbonyl group may be in α-position, for instance acetyl, or keto groups where the carbonyl group is otherwise placed. Examples of the latter are orcinol, phloroglucinaldehyde, phloracetophenone, gallic acid and gentisic acid.

In benzene substituted by four reactive groups the above mentioned possibilities of variation also exist.

However, according to the invention primary substances with several aromatic nuclei may also be used having two or more groups of the above kind which are able to condense with phosphoric acid or thiophosphoric acid, i.e. OH, SH and NH groups (called reactive groups for short) which are connected to one benzene nucleus or to several nuclei. Thus the benzene nucleus in compounds of the above type may be replaced by naphthalene or by other condensed aromatic ring systems such as anthracene and phenanthrene. Even alkyl substituted condensed ring systems, such as methyl naphthalene, propyl naphthalene, hexyl naphthalene, dimethyl naphthalene, methyl-ethyl-naphthalene and corresponding carbon structures derived from anthracene and phenanthrene are suitable as primary substances, if they are substituted in the above manner. However, two or several aromatic nuclei may even be interconnected otherwise. Thus anthraquinone which is substituted by two or more reactive groups, for instance 1,2,5,8-tetrahydroxyanthraquinone, has been found suitable as a primary substance. Also diphenyl, diphenylmethane, diphenylethane, triphenylethane, the latter three ring systems substituted, if desired, with alkyl, alkylene or cycloalkyl groups, for instance methyl, propyl, propylene, hexyl or cyclohexyl at one or both of the aliphatic carbon atoms are suitable as primary substances provided that they possess two or more reactive substituents connected to the nucleus, as are also such substances substituted with the said aliphatic or cycloaliphatic substituents at the aromatic group.

In these substances the aromatic nuclei are interconnected by means of carbon bridges, but suitable primary substances may also be obtained if the interconnection is by means of an oxygen, sulphur or nitrogen bridge or a bridge containing a sulphur, oxygen or nitrogen atom and one or two carbon atoms.

In the bride not only alkyl substituents, but also keto groups may be present, as in the case of 2,4,4′,6-tetra hydroxybenzophenone.

Examples of primary substances having a nitrogen bridge are diphenylamine, triphenylamine, dinaphthylamine, naphthylphenylamine and others, in which the aromatic nuclei have reactive substituents as described above.

Examples of primary substances in which two aromatic nuclei are connected with a bridge containing two nitrogen atoms are azobenzenes, substituted in the described manner. Examples of substances having a bridge containing carbon as well as nitrogen are phenylbenzylamine, dibenzylamine, tribenzylamine and others having reactive groups as described in at least one of the aromatic nuclei.

In diphenylether, substituted in the described manner, the bridge is an oxygen bridge and these and similar compounds are suitable as primary substances. Examples are 4,4′-dihydroxy-diphenyl ether, 4,4′-diamino-diphenyl ether and several trisubstituted diphenyl ethers, but also for example di- and polyhydroxy or di- and polyamino-naphthyl-phenyl ethers are suitable. Further similar compounds which are derivatives of for instance dibenzyl ether may find use. A more complicated oxygen-containing bridge is present in the also suitable ethylenediglycol-bis-4-hydroxy-phenyl ether.

It is also possible to prepare suitable substances in which the bridge contains sulphur instead of oxygen, for instance 4,4′-dihydroxyphenyl sulphide and p,p′-methylenedithiodianiline, both of which are suitable. Also disulphides may be used as primary substances, for instance 4,4′-dihydroxydiphenyl disulphide.

An oxygen bridge between two aromatic nuclei in the molecule, substituted as described, may also be in the shape of an ester link, for instance in 4-hydroxybenzoic acid 3,5-dihydroxyphenyl ester.

It appears from the above that the kind and constitution of the primary substance and the manner in which such substance is substituted does not influence its suitability in accordance with the invention, when the above simple conditions are fulfilled. However, the possible substituents ought to be of a kind not reacting disturbingly with the agent used for introducing the phosphoric acid or thiophosphoric acid groups. As examples of such substituents halogens as well as nitro, alkyl, keto and aldehyde groups are mentioned above.

It is of substantial importance for obtaining a high antienzymatic effect that the degree of polymerization is sufficiently high. Thus dialyzable compounds have only a negligible antienzymatic effect. In accordance herewith the lower limit for the molecular weight is about 2000. The higher limit is determined thereby that the products should be soluble in neutral or alkaline aqueous solutions.

Accordingly the invention also comprises a method for the production of antienzymatic substances of the described kind, consisting in that phosphoric acid residues— comprising also thiophosphoric acid residues—are built up to form a polymer organic phosphoric acid compound in which each phosphoric acid residue is connected to the next one through an organic compound until a molecular weight of at least 2000 has been obtained.

The building up of such compound may take place by bringing a phosphorylating agent, such as phosphorus oxychloride, thiophosphoryl chloride or phenylphosphoryl dichloride to react at condensation conditions, preferably using a tertiary amine as a hydrogen chloride binding agent, with one or more aromatic or aromatic-aliphatic compounds containing three or more OH, SH or NH-groups linked to the nucleous or two such groups which are either bound to different nuclei or are in meta- or para-postion to each other at the same nucleus, after which the resulting condensation products are subjected to a hydrolysis in which compounds, if they contain two or more nuclei connected by a bridge, the same consists of not more than 2 atoms from the groups consisting of C, O, S and N. The hydrolysis results in the splitting off of the groups, for instance chlorine atoms, which in the phophorylating agent are linked to the phosphoric acid residue and which during the condensation have not been replaced by links to the organic radicals, and these halogen atoms are replaced by hydroxyl groups, whereby free phosphoric acid groups are formed in the condensation product, i.e. one or two of the valencies of the phosphorus is linked with an organic group through O, S or N, whereas the other one or two or one valencies are linked to OH, whereby the products become strongly acid and may form salts, whereof the alkali salts may be soluble.

During the phosphorylating the primary substance may suitably be dissolved in a solvent which is not reacted upon by the phosphorylating agent, whereby the solvent may consist throughout or partly of the condensation agent itself in accordance with a method usually applied by phosphorylating organic substances. An appropriate embodiment of the method according to the invention, whereby products having considerable antienzymatic properties are particularly and certainly obtained, is characterized in that suitable conditions for the condensation are maintained in the anhydrous medium by cooling during the phosphorylating, slow addition of the phosphorylating agent or the condensation medium, periodical addition of the same by letting the reaction mixture stand for some time before hydrolysis, or by other similar measures, until at least the desired degree of condensation is obtained and then interrupting the condensation, and, if the latter has gone too far, hydrolyzing the obtained product, for instance by means of water, acid or alkali, and, if necessary, heating until the degree of condensation is reduced to the desired value. To obtain a sufficient condensation it is expedient to use a not too great surplus of the phosphorylating agent. Therefore, it is expedient to add the phosphorylating agent to a solution of the primary substance and not the other way, since in the latter case the phosphorlyating agent would be present in a particularly great surplus at the beginning of the process, whereby phosphorylation might be terminated without sufficient condensation with the molecules of the primary substance having been obtained. However, a certain adjusted proportion of the phosphorylating agent, corresponding to the amount of phosphorus present in the resulting compound when this is built up as described above, may be present at the beginning of the process in mixture with the primary substance and a possible solvent, the phosphorylation then being cautiously carried out by gradually adding the condensation agent. Finally, the phosphorylation may be carried out without using a condensation agent, but in this case it proceeds very slowly. The condensation agent may in known manner be a substance which is able to bind the component, for instance hydrogen chloride, formed by the condensation in the anhydrous medium, said component being hydrogen chloride if phosphorus oxychloride, thiophosphoryl chloride or phenylphosphoryl dichloride is used as a phosphorylating agent.

By varying the reaction conditions, for instance the reaction medium, the manner of addition, the speed of addition, the amount of phosphorylating agent and other possible variables, products with differing properties may be formed. Even small variations may have influence, particularly when the primary substances contain more than two reactive groups, in which case the condensation will generally proceed faster than by compounds having only two reactive groups. However, in all cases it is possible to maintain suitable conditions for the condensation in the anhydrous medium until a degree of condensation at least corresponding to that desired is obtained. Thereby either compounds are obtained having an antienzymatic effect, or such compounds are obtained when the degree of condensation is reduced by hydrolysis of the primarily obtained products to a value at which the condensation product is soluble in an aqueous solution of alkali without the degree of condensation becoming so low that the molecular weight of the product drops below 2000, whereby the product would be dialysable.

As formerly mentioned, the phosphorylation is generally carried out by addition of the phosphorylating agent, for instance phosphorus oxychloride or thiophosphoryl chloride to a solution of the primary substance.

As stated above, the solvent may be one which is indifferent during the process. To this end solvents, such as ether, dioxan, acetone or other ketone solvents, and halogenated hydrocarbons, are suitable. It is a condition that such solvent shall be liquid and shall maintain good dissolving properties at the temperatures in question. Since it is generally necessary to cool strongly during the process and thus work at low temperatures for instance −20° C., whereas on the other hand it may be expedient to let the temperature rise about 50° C. and in certain cases still higher, it is expedient that the melting point of the solvent lie below 0° C., preferably below −20° C., and that its boiling point exceed 50° C. Examples of suitable ketone solvents are methylethyl ketone, methyl-n-proplyketone, diethyl ketone, hexanone-2, pinacolin and di-n-propyl ketone. Examples of chlorine containing solvents are chloroform, ethylene chloride and ethylidene chloride. These and other substances may be used singly or in mixtures.

However, the solvent may also be the condensation agent used by the process, for instance a tertiary amine, among which pyridine, picoline, lutidine, quinoline and dimethylaniline are suitable. In certain cases it may, however, be expedient to use such condensation agents mixed with indifferent solvents.

Since heat is evolved during the phosphorylation, it is generally suitable to cool fairly strongly in order to regulate the process and thereby insure that good conditions for the condensation are maintained even at the beginning of the phosphorylation when a great surplus of primary substance molecules are still present, all reacting groups of which are free, i.e. not bound to phosphorus. To this end the reaction mixture may be in contact with cooled surfaces for the cooling of which any suitable cooling agents may be used, for instance cooled brine. In many cases it is also expedient that the solution, in which the phosphorylating agent is going to react with a primary substance, is vigorously cooled before the reaction, for instance down to −10 to −20° C. During the reaction, a low temperature is maintained which in almost all cases is room temperature or lower, and only in the cases where the phosphorylation proceeds too slowly, the temperature is allowed to rise to a suitable higher value.

As mentioned above, the time used for the primary phosphorylating process may be varied by varying the rate of addition of either the phosphorylating agent or the condensation agent. In most cases it is expedient that the said time is not under about 30 seconds, but in many cases it may expediently be considerably increased as appears from the following examples. Thus suitable periods of addition are nearly one hour, but in most cases it is possible, without disadvantage, to carry through the addition during ½ to 25 minutes. In certain cases it may be expedient to make the additions during several periods with intervening periods of rest during which the temperature may be allowed to rise, if desired, for instance to room temperature or to a temperature between room temperature and 50° C., if this is necessary to obtain a sufficient condensation within a reasonable time. When the addition is again resumed, care should be taken to cool to such an extent that the temperature does not rise so much that the process proceeds without control.

Even if considerable condensation has already taken place when the addition is brought to a conclusion, it will generally be necessary or expedient to let the reaction products stand for a shorter or a longer period in order that the condensation may attain the degree desired in the final product, i.e. that the molecular weight shall be 2000 or more, and that the product shall not be dialyzable. In many cases it is expedient to let the reaction products stand at room temperature, about 15–20° C., and a suitable condensation time will then generally be between ½ and 24 hours as appears from the following examples. It goes without saying that this period of standing may be reduced considerably by increasing the temperature and generally there seems to be no disadvantage in increasing the temperature to about 50° C. However, the invention also comprises the use of still higher temperatures in cases when this does not prevent obtaining suitable products according to the invention.

If products, which after hydrolysis are soluble in aqueous alkali solutions, are obtained by phosphorylation and subsequent condensation, it will be found that such products have a good antienzymatic effect.

The reaction is then terminated by diluting with ice-water, whereby also a surplus of phosphorylating agent is destroyed.

The produced polymer compound is now present in aqueous solution together with the hydrochloride of the applied tertiary amine. Depending on the properties of the thus produced substances, these may be purified in different manners. The most important of the properties which are determinative for the method to be used for purification is the stability of the compounds in aqueous solution.

Concerning the stability of the compounds in aqueous solution it may generally be said that products produced from primary substances having more than two reactive groups are as a rule more stable than those prepared from primary substances having only two reactive groups. Particularly this holds good when both reactive groups are linked to the same aromatic ring. There seems to be two reasons herefore, namely in the first place that the molecular structure in the former case is more branched (cross linked), and in the second place that the third valency of the phosphorus is not so often coupled in the former case. As is well known substances of the type:

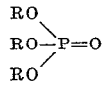

are fairly easily hydrolyzed to

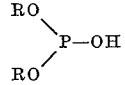

the latter substances being more resistant against hydrolysis. If the compound has good stability, it may be purified by dialysis followed, if desired, by evaporation to dryness. In certain cases, particularly of primary substances with several nuclei, the polymer substances are more difficultly soluble in strongly acid solutions, and accordingly they can be precipitated, filtered off and dried in a simple manner.

If, however, the substances have poor stability in aqueous solution, these methods cannot always be applied, since the condensation product is too easily hydrolyzed thereby. In such cases the product may be isolated by cautious evaporation to dryness of the aqueous solution obtained by the reaction, without preceding dialysis. Generally, a viscous thick oil is obtained hereby. By grinding with dilute hydrochloric acids, which may be saturated with common salt, and drying, the said oil may in certain cases be recovered as a hygroscopic powder consisting of a salt of the polymer compound and the tertiary amine used in the reaction.

In many cases, compounds with good properties from a preparative point of view may also be prepared from primary substances having only two reactive groups. Thus, for instance, phosphorylation of p,p'-dihydroxydiphenyldimethylmethane results in a polymer product which is easily isolated from an aqueous solution by precipitation with an acid. In other cases the resulting products may find use in the form in which they are recovered, and consequently it is not of vital importance whether they have good properties from a preparative point of view.

If the condensation results in a product having too high molecular weight, a sufficient depolymerization must be performed. To this end it may be necessary, after isolation which in this case always is very easily carried out, since the compound is insoluble in water, to let the products stand with water and preferably a hydrolysis catalyzing agent, for instance acid or alkali, until the hydrolysis has taken place. If desired, the hydrolysis may be accelerated by boiling at atmospheric pressure in which case the boiling time rarely exceeds a few hours and may go down to a few minutes. Exceptionally, when a very high polymer and resistant primary product is obtained, it may be autoclaved. During the hydrolysis, samples should be taken to ascertain when a soluble product is obtained. The depolymerization may also be carried out in other manner, for instance, by heating the solid product.

The antienzymatic properties of the products prepared according to the invention depend mainly on their molecular weight. In the following these properties will be characterized by the number which at a certain concentration indicates how many percent they inhibit the enzyme system hyaluronic acid hyaluronidase.

In the drawings two diagrams are shown in connection with which these relations will be more closely explained.

In FIGURE 1, curve 1 indicates the variation of the relation between inorganic phosphorus and the total amount of phosphorus in a solution of polyphloroglucin phosphate produced according to the invention when the said substance is boiled with dilute hydrochloric acid for the time stated along the abscissa. On the axis of the ordinates the numbers to the right indicate percent. It appears that 12.6% of the phosphorus is inorganic in the original product, but by hydrolysis this part of the phosphorus increases so that it amounts to 56.3% after boiling for 100 hours.

In the same figure, curve 2 shows the proportion in percent of the organic bound phosphorus which after boiling with hydrochloric acid passes a dialysis diaphragm when the relation between the outer and the inner volume is 4:1. The curve shows that whereas less than 10% of the organic phosphorus in the original product is dialyzable, after 25 hours' boiling 44% may already pass the dialysis diaphragm under the conditions stated above. Thus the molecular weight of a large part of the product has fallen below the molecular weight of about 2000, which is necessary for dialyzability.

Finally, curve 3 shows how much of the substance is necessary for producing 80% inhibition. This proportion amounts for the original substance to 0.5 times, after 25 hours' boiling to about 50 times and after 100 hours' boiling to not less than 5000 or 10,000 times the amount of the original product. It appears from these tests that products with a low degree of polymerization have only an insignificant antienzymatic effect.

Figure 2:
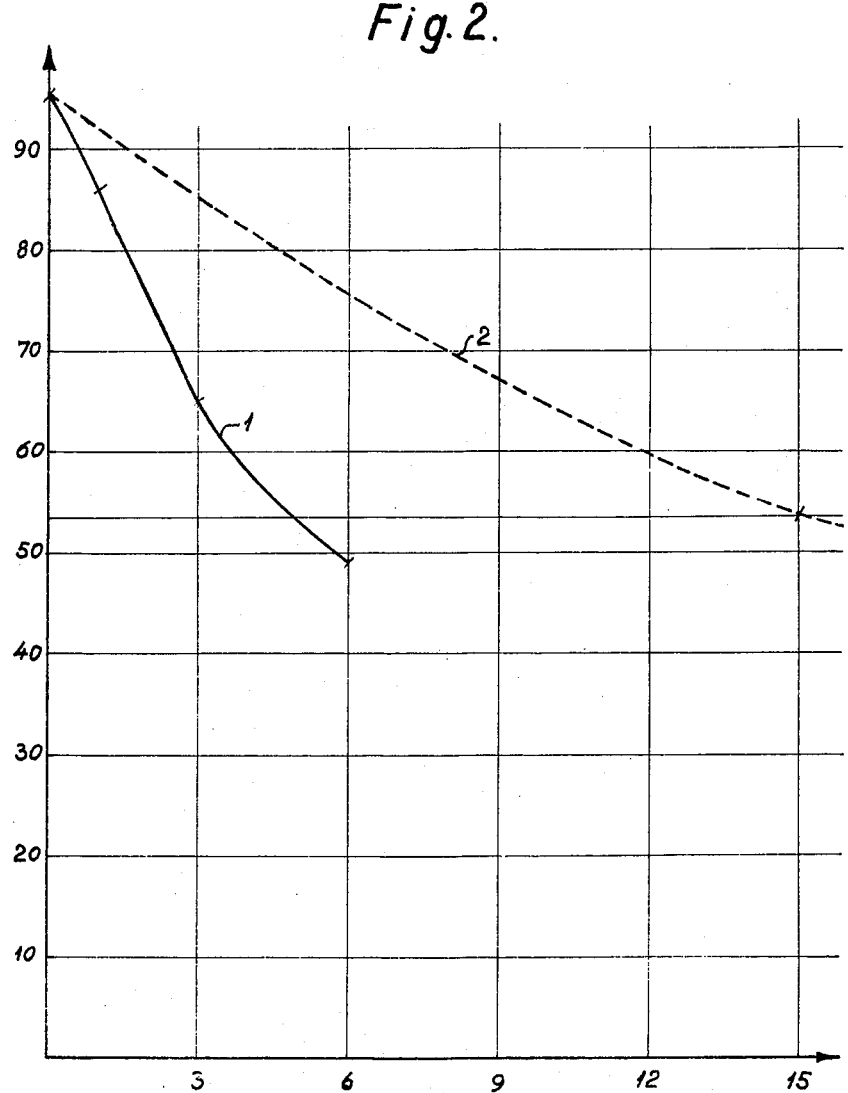

As an indication of the inhibition there is in the following examples used "percent inhibition" calculated by the formula:

$$\text{Percent inhibition} = \frac{H_2 - H_1 \cdot 100}{H_2}$$

where, in a given solution of hyaluronidase, $H_1$ is the reaction time necessary to halve the viscosity of a given solution of hyaluronic acid suitable as a substratum, whereas $H_2$ is the reaction time which is necessary to halve the viscosity when the hyaluronidase acts upon a mixture of the same solution of hyaluronic acid to which a substance with antihyaluronidase effect is added. FIGURE 2 shows an example where the abscissa indicates the time during which hyaluronidase, or a mixture of hyaluronidase with the substance which is to be tested, acts upon a standard solution of hyaluronic acid, and the ordinate indicates the traversion time in an Ostwald-viscosity-meter.

Curve 1 shows the relation between reaction time and viscosity when bovine hyaluronidase is used. Thereby 0.1 cc. of an enzyme solution is used, containing 2 VRU (viscosity reducing unit, defined as the proportion of enzyme, which halves the viscosity of the subtratum in question during 10 minutes). As a substratum there is used hyaluronic acid produced from umbilical cords after the method described by Jeanloz and Forchielli (Journ. of Biol. Chem. 186, 495 (1950)). The solution contains 0.3% of this hyaluronic acid in a McIlvaine's buffer mixture with pH=7. The enzyme solution is mixed with 3 ccs. of substratum and 0.9 cc. of buffer.

Curve 2 shows the relation between reaction time and viscosity for a similar mixture, which furthermore contains the substance, the antienzymatic effect of which is to be determined. The proportions of the mixture are: 0.1 cc. of enzyme, 0.7 cc. of buffer and 0.2 cc. of a neutral aqueous solution of the product whose antienzymatic effect is to be determined, and 3 ccs. of substratum.

The quantities $H_1$ and $H_2$ are determined by the points of intersection with the horizontal line A, the ordinate of which is half the sum of the traversion times of the buffer solution and the substratum diluted with buffer in the proportion 3:1, respectively.

In the following a number of examples of the production of different substances according to the invention will be given.

Example 1

2.5 g. of phloroglucinol are dissolved in 25 ccs. of anhydrous pyridine. The solution is cooled to −10° C. A solution of 2 ccs. of phosphorus oxychloride in 10 ccs. of anhydrous pyridine is added dropwise with cooling and shaking. Addition time: 5 minutes. After the addition is finished, the solution is left standing in a cooling bath until turbidity commences which generally takes about 30 minutes. When turbidity commences, the mixture is hydrolyzed with finely crushed ice, whereby a substantially clear solution is obtained. This solution, containing polyphloroglucinol phosphate, is evaporated in vacuum, whereby a viscous oil is obtained. The latter is dissolved in 100 ccs. of water, and 40 ccs. of 1-normal barium chloride solution are added. Then concentrated ammonia is added till alkaline reaction. Thereby minor quantities of barium phosphate precipitates, which are removed by centrifuging. The clear solution is mixed with an equal volume of 95% ethanol, whereby a bulky precipitate is obtained, consisting of the barium salt of polyphloroglucinol phosphate. This is removed by centrifuging and washed once with 50% ethanol, once with 95% ethanol and finally with ether. The product is dried in vacuum over phosphorus pentoxide. Yield about 5 g. Faintly purple powder. Analysis: 9.18% P, 31% Ba. Inhibition (40γ/4 ccs.):70%. From the barium salt, polyphloroglucinolphosphate may be obtained in aqueous solution by adding sulphuric acid to an aqueous solution of the barium salt.

Example 2

6.3 g. of phloroglucinol are dissolved in 50 ccs. of anhydrous pyridine. The solution is cooled to −10° C. A solution of 10 ccs. of phosphorus oxychloride in 50 ccs. of anhydrous pyridine are added with shaking and cooling. Time of addition: 9 minutes. After 8 minutes, the solution begins to be turbid. After ½ hour in the cooling bath a rather copious precipitate has been formed. After all together 4 hours in the cooling bath, hydrolysis with finely crushed ice is carried out after which the resulting mixture stands at room temperature for 7 days. Still rather much is undissolved. This is removed by centrifuging, washed with 2 n hydrochloric acid, water and acetone and then dried in an exsiccator over phosphorus pentoxide. An inhomogeneous reddish mass is obtained. Yield 8.7 g. 1 g. of this mass is boiled with 100 ccs. of water. After 45 minutes the substance has dissolved whereby 21% of the originally organic phosphorus have been hydrolyzed to inorganic P. Calculated on 20γ/4 ccs. starting material, the product shows an inhibition of 34%.

1 g. of the starting material is boiled with 100 ccs. of 0.1 n hydrochloric acid whereby a clear solution is obtained after 15 minutes. Inhibition as above 19%. 10.6 inorganic P are formed by the hydrolysis.

Example 3

12.6 g. of phloroglucinol are dissolved in 100 ccs. of anhydrous pyridine. At −15° C. a solution of 5 ccs. of phosphorus oxychloride in 30 ccs. of anhydrous pyridine are added with shaking. Time of addition: 4½ minutes. The solution is left standing in a cooling bath for a further 3 hours and then at room temperature for 15 hours whereafter a rather large precipitate has been formed. The mixture is hydrolyzed with finely crushed ice, whereby a clear solution is obtained. This is evaporated in vacuum whereby a viscous oil is obtained. Inhibition (20γ/4 ccs.): 90–95%. After 14 days at room temperature (pH=7), the inhibition has decreased to abt. 50%. After 1 month further at room temperature, the inhibition is still 50%. By this hydrolysis no inorganic phosphorus is liberated, which suggests that it is the third valency of the phosphorus which is hydrolyzing partly. By autoclaving (120° C., 20 minutes), the inhibition also decreases to 50%.

Example 4

10.1 g. of phloroglucinol are dissolved in 120 ccs. of quinoline. The solution is cooled to −10° C. A solution of 4 ccs. of phosphorus oxychloride in 20 ccs. of quinoline are added dropwise with shaking and cooling. Time of addition: 10 minutes. After a further 10 minutes in a cooling bath, the temperature is raised to 20° C. and kept there for 30 minutes. Cooling is then resumed to −10° C. after which a solution of 8 ccs. of phosphorus oxychloride in 20 ccs. of quinoline are added all at once. Thereby the temperature transiently rises to −5° C. After a further 10 minutes in the cooling bath, the temperature is raised to +20° C. After abt. 15 minutes the solution becomes turbid and viscous. After a further couple of minutes, hydrolysis with finely crushed ice is performed. Then 2 n caustic soda is added till pH=11 and the solution is repeatedly shaken up with ether. The solution is then freed from ether and is strongly acidified with 2 n hydrochloric acid. An easily filterable precipitate is obtained which is removed by suction, washed with 0.5 n hydrochloric acid and dried in an exsiccator over potassium hydroxide and phosphorus pentoxide. Yield 22.1 g. Contents of phosphorus 14.3%. Light-brown powder, fairly soluble in water. Inhibition (20γ/4 ccs.): 98%.

*Example 5*

100 g. of phloroglucinol are dissolved in 600 ccs. of anhydrous pyridine. The solution is cooled to −12° C. A solution of 4 ccs. of phosphorus oxychloride in 300 ccs. of anhydrous pyridine is added with stirring. Time of addition: abt. 25 minutes. Towards the end of the addition, the solution begins to be turbid. After the addition is finished, the reaction vessel is left in the cooling bath with periodical shaking. After abt. 10 minutes, the solution has become very viscous, and the temperature rises somewhat. Then the reaction mixture is kept for two hours at room temperature whereby it solidifies to a solid hard cake. Now hydrolysis is performed with finely crushed ice. After abt. 2 days, the mixture resembles a porridge, containing a number of hard lumps. The lumps are crushed in a mortar whereafter the mixture is filtered and washed repeatedly with water. The precipitate is then mixed with 1 liter of 2 n hydrochloric acid, filtered and carefully washed with water till the pH of the filtrate is abt. 5. Finally the precipitate is washed with 3 to 4 liters of acetone. The white substance is dried at 105° C. and pulverized whereby a rosy hygroscopic powder is obtained. Yield 160–180 g. Analysis: Humidity 1 to 3%, pyridine 22 to 24% (calculated on a dried sample), phosphorus 17.5% to 18.5% (calculated on a sample, freed from humidity and pyridine). As appears from the above, the product is insoluble in water at acid as well as alkaline pH. Further it is insoluble in organic solvents. The product thus consists of very high-molecular polyphloroglucinolphosphate.

However the product may be converted into a soluble form by partial depolymerization. This may be brought about in different manners. Good results are obtained by boiling the substance with dilute mineral acid as follows:

140 g. of highly polymerized polyphloroglucinolphosphate are mixed with 4 liters of 0.1 n hydrochloric acid. The mixture is left standing during the night. The next day the mixture is boiled till a clear solution is obtained. This takes 3–4 hours. After cooling, 5 n caustic soda is added till pH=7.5 to 8 whereafter the solution is evaporated in vacuum to a maximum of 2 liters. This solution now has a light-brown colour. The thus obtained solution is substantially free from pyridine. Abt. 15% of the total phosphate contents are inorganic phosphorus. If the solution is dialysed and then evaporated in vacuum as far as possible, a red-brown oil is obtained which after drying in vacuum at 50° C. and pulverizing is a brownish, particularly hygroscopic powder, consisting of the sodium salt of the partly depolymerized polyphloroglucinolphosphate. Inhibition (20γ/4 ccs.) 95–100%.

*Example 6*

5 g. of phloroglucinol are dissolved in a mixture of 2 liters of dry acetone and 2 liters of dry chloroform. The solution is cooled to 10° C. Then 400 ccs. of phosphorus oxychloride are added. 1400 ccs. of anhydrous pyridine are added with stirring and continuous cooling in the following manner. During abt. 20 minutes 400 ccs. are added, whereby the temperature remains at abt. 0° C. After this the solution begins to become turbid. Now the remaining 1000 ccs. of pyridine are added all at once. Thereby the temperature rises to abt. 25° C. After abt. 10 minutes, the solution has become viscous, owing to incipient precipitation. The stirring is continued till the temperature has fallen to −5° C., which takes a further 15 minutes. The mixture is left standing for still ½ hour with stirring, whereafter it stands at room temperature till next day. Now the precipitate is removed by suction, washed with acetone and suspended in water. After 24 hours, the precipitate is filtered off, washed with acetone and dried at 60–70° C. Yield 1.06 kgs. Analysis: humidity 6.4%, pyridine 25.0% (calculated on a dry sample), chlorine 3.9% (ditto), phosphorus 12.8% (ditto). This product is high-molecular and insoluble like the product according to Example 5 and, like the latter, it may be converted into a soluble product with antienzymatic properties by partial depolymerization.

35 g. are boiled with 800 ccs. of 0.1 n hydrochloric acid. After nearly 3 hours of boiling, a clear light yellow solution is obtained. An amount of solution corresponding to an amount of starting material of 0.5γ/4 ccs. gives 80% inhibition. From the solution, the substance may be purified by dialysis and subsequent evaporation. In this case it is obtained as a hygroscopic powder.

The depolymerization may also be carried out by heating the substance for a longer time at higher temperature.

If, for instance, the substance is heated at 160° C. it sinters by and by and after 4 hours a red melt is obtained which after cooling solidifies to a brittle mass. To this water is added, whereby everything is dissolved after abt. 75 hours at room temperature. The yellow-brown solution shows an inhibition of 72% (20γ/4 ccs.). 95% of the total phosphorus is organic bound.

*Example 7*

2.6 g. of phloroglucinol are dissolved in 20 ccs. of anhydrous pyridine. The solution is cooled to 10° C., whereafter a solution of 2.2 ccs. of thiophosphoryl chloride in 10 ccs. of anhydrous pyridine are added dropwise with cooling and shaking. Time of addition: 2 minutes. The colour of the solution by and by becomes red. After further 1½ hours in the cooling bath, the soultion starts to become turbid, and after a further 15 hours a rather large precipitate has been formed, and the solution has become jelly-like. Hydrolysis is then carried out with finely crushed ice and after 24 hours a substantial clear solution is obtained. By evaporating this solution in vacuum, a red oil is obtained. Inhibition (20γ/4 ccs.) 100%.

*Example 8*

2.2 g. of hydroquinone are dissolved in 20 ccs. of anhydrous pyridine. The solution is cooled to −10° C. A solution of 0.95 cc. of phosphorus oxychloride in 10 ccs. of anhydrous pyridine are added with cooling and shaking. Time of addition: 2½ minutes. After 1 hour in a cooling bath, the mixture is left standing for 15 hours at room temperature. The solution is still clear. Now hydrolysis is carried out with finely crushed ice. A clear solution is obtained which is evaporated in vacuum whereby a light yellow oil is obtained. This is stirred with 2 n hydrochloric acid, whereby a viscous semi-solid mass is obtained which is dried in vacuum over phosphorus pentoxide and potassium hydroxide. Inhibition (20γ/4 ccs.) 43%. After a week in aqueous solution at room temperature, the inhibition decreases to zero, which shows that the polyhydroquinone phosphate produced in this manner is quite unstable.

Example 9

22 g. of hydroquinone are dissolved in 125 ccs. of anhydrous pyridine, and at −5° C. a solution of 12.5 ccs. of phosphorus oxychloride in 50 ccs. of anhydrous pyridine are added. Time of addition: 11 minutes. The mixture is left in the cooling bath and has become jelly-like after 1½ hours. Then the mixture is left at room temperature for 15 hours whereafter no further changes occur. Now, hydrolysis is carried out with finely crushed ice, whereby the precipitate slowly dissolves. After 48 hours a clear solution is obtained which is evaporated in vacuum. A yellow oil is obtained which is stirred with 2 n hydrochloric acid, yielding a thick semi-solid mass which is washed with water, whereby the mass becomes more solid, and the colour brightens. Drying over phosphorus pentoxide and potassium hydroxide. Yield 29 g. Analysis: 21.7% humidity (60° C. in vacuum), 12.1% organic phosphorus (calculated on a dry sample), 0.9% chlorine (calculated on a dry sample) 14.1% pyridine (calculated on a dried sample). The substance is soluble in sodium bicarbonate solution, from which it may again be precipitated by dilute hydrochloric acid. Inhibition (20γ/4 ccs.) 97%. After a week in aqueous solution at room temperature, the inhibition has decreased to 38%. No organic phosphorus is formed thereby. By autoclaving (120° C., 20 minutes) the inhibition falls to abt. 15%. No organic phosphorus is formed hereby.

Example 10

2.2 g. of hydroquinone are dissolved in 20 ccs. of anhydrous pyridine. The solution is cooled to −10° C., whereafter a solution of 1.9 ccs. of phosphorus oxychloride in 10 ccs. of anhydrous pyridine is added with cooling and stirring. Time of addition: 2½ minutes. The mixture is left to stand in the cooling bath for 1 hour and is then kept at room temperature for 15 hours after which all is solidified to a jelly-like mass. This is now hydrolyzed with finely crushed ice whereby the precipitate dissolves by and by. After 24 hours, a clear, colourless solution is obtained which is evaporated in vacuum. Thereby a light yellow oil is obtained. This is treated by stirring with 2 n hydrochloric acid whereby a colourless viscous oil is obtained which is dried over phosphorus pentoxide and potassium hydroxide whereby a brittle hygroscopic powder is obtained. Inhibition (20γ/4 ccs.): 74%. After 10 days in aqueous solution at room temperature, the inhibition has decreased to 68%.

Example 11

2.2 g. of hydroquinone are dissolved in 20 ccs. of anhydrous pyridine. The solution is cooled to −10° C., whereafter a solution of 2.7 ccs. of phosphorus oxychloride in 10 ccs. of anhydrous pyridine is added with cooling and shaking. Time of addition: 3½ minutes. Already during the addition, the solution becomes turbid. After addition the mixture is left standing for 2 hours in the cooling bath and is kept at room temperature for 12 hours. Then it is hydrolyzed with finely crushed ice whereby a clear solution is obtained. This is treated as described in Example 10 and with the same result. Inhibition (20γ/4 ccs.): 20%. An increase of the amount of phosphorus oxychloride results in inferior inhibition. The conditions of polymerization have become less suited.

Example 12

2.2 g. of resorcinol are dissolved in 20 ccs. anhydrous pyridine. The solution is cooled to −10° C. A solution of 1.25 ccs. of phosphorus oxychloride in 10 ccs. of pyridine is added with cooling and shaking. Time of addition: ½ minute. The mixture stands for 2 hours in a cooling bath and then 15 hours at room temperature. It is then hydrolyzed with finely crushed ice, whereby a clear solution is obtained. The inhibition is determined directly in the solution and on an amount corresponding to 20 ccs. of starting material. Inhibition (20γ/4 ccs.): 100%, aqueous solution after 3 days: 74%, after 7 days: 10%.

Example 13

As Example 12. Time of addition: 3 minutes. Corresponding inhibition: 100, 75, 38%.

Example 14

As Example 12. Time of addition: 7 minutes. Corresponding inhibition: 100, 88, 86%. After a further 5 days, the inhibition decreases to 30%. From these examples it appears that in this case a slow addition is advantageous.

Example 15

2.2 g. of resorcinol are dissolved in 20 ccs. of anhydrous pyridine. The solution is cooled to −10° C. after which one half of a solution of 1.25 ccs. of phosphorus oxychloride in anhydrous pyridine is added with cooling and shaking. Time of addition: 2½ minutes. The mixture is left standing in a cooling bath for 20 minutes. Then the remaining phosphorus oxychloride is added during 2½ minutes. The mixture is then left standing for 2 hours in the cooling bath and again for 15 hours at room temperature. Then it is hydrolyzed with finely crushed ice. The solution is evaporated in vacuum, whereby a viscous oil is obtained which is stirred, first with 2 n hydrochloric acid and then with water whereby a viscous white oil is obtained which after drying forms a hygroscopic powder. Inhibition (20γ/4 ccs.): 88%. The aqueous solution is not stable. Yield 3.5 g.

Example 16

⅓ of a solution of 2.2 g. of resorcinol in 30 ccs. of anhydrous pyridine is added dropwise to a solution of 1.25 ccs. of phosphorus oxychloride in 10 ccs. of pyridine (cooled to −10° C.) with cooling and shaking. Time of addition: 2 minutes. The mixture is left standing in a cooling bath for 7 minutes whereafter a further ⅓ of the resorcinol solution is added dropwise during 2 minutes. After a further 13 minutes in the cooling bath the remaining third of the solution of resorcinol is added during 2 minutes. The mixture is left standing for a further 2 hours in the cooling bath and then for 15 hours at room temperature. Then it is hydrolyzed with finely crushed ice, whereby a clear solution is obtained. From this solution the polyresorcinol phosphate may be isolated according to Example 15. Inhibition: (20γ/4 ccs.): 91%. After 5 days in aqueous solution at room temperature the inhibition has decreased to 30%.

Example 17

2.2 g. of resorcinol are dissolved in 20 ccs. of anhydrous pyridine. The solution is cooled to −15° C., whereafter a solution of 1.25 ccs. of phosphorus oxychloride in 10 ccs. of anhydrous pyridine are added with cooling and shaking. Time of addition: 7 minutes. The mixture is left standing in a cooling bath. After 3 minutes a sample of 1 cc. is taken, hydrolyzed and diluted to a dilution corresponding to 20γ/4 ccs. at the testing. Inhibition: 0. This also holds good at a dilution corresponding to 200γ/4 ccs. at the testing. After a further 2 hours in the cooling bath (temperature: −11° C), in a corresponding manner the inhibition is 43%. After 24 hours in aqueous solution the inhibition decreases to 10%. After a further 2½ hours in the cooling bath (temperature: 0° C.) in the same manner the inhibition is 43%. After 24 hours in aqueous solution the inhibition has increased to 91% and after further 2 days decreased to 15%. The remainder is kept at room temperature for 15 hours, whereby the mixture becomes jelly-like, whereafter it is hydrolyzed with finely crushed ice. In the same manner 100% inhibition is now obtained, and with 4γ/4 ccs.: 37%. After 3 days in aqueous solution the inhibition (20γ/4 ccs.) has decreased to 33%.

Example 18

2.2 g. of resorcinol are dissolved in 20 ccs. of anhydrous pyridine. The solution is cooled to −10° C., whereafter a solution of 3 ccs. of phenylphosphoric acid dichloride in 10 ccs. of anhydrous pyridine is added during 3 minutes with cooling and shaking. The mixture is left standing for 2 hours in a cooling bath and then for 15 hours at room temperature. Then it is hydrolyzed with finely crushed ice whereby a clear solution is obtained. By evaporation in vacuum, the product is obtained as a viscous oil. Inhibition 20γ/4 ccs.: 30%.

Example 19

2.2 g. of resorcinol are dissolved in 20 ccs. of anhydrous pyridine. The solution is cooled to −14° C., whereafter a solution of 1.4 ccs. of thiophosphoryl chloride in 10 ccs. of anhydrous pyridine are added during 8 minutes with cooling and shaking. The mixture is left standing for 2 hours in a cooling bath and then for 15 hours at room temperature. It is now hydrolyzed with finely crushed ice, whereby a clear solution is obtained. By evaporation of the latter the product is obtained as a yellow, easy flowing oil. The oil is washed with 2 n hydrochloric acid and water and dried in an exsiccator over phosphorus pentoxide and potassium hydroxide, whereby 2.5 g. of a light yellow, almost solid mass is obtained. Inhibition (20γ/4 ccs.): 80%. After 4 days in aqueous solution at room temperature the inhibition has decreased to 43%.

Example 20

1.1 g. of hydroquinone and 1.3 g. of phloro-glucinol are dissolved in 20 ccs. of anhydrous pyridine. At −10° C. a solution of 1.65 ccs. of phosphorus oxychloride in 10 ccs. of pyridine is added with shaking. Time of addition: 2 minutes. After 20 minutes a precipitate begins to form, and after 1½ hours the solution is filled with precipitate. The mixture is then left standing for 15 hours at room temperature, whereafter it is hydrolyzed with finely crushed ice. After standing at room temperature for 72 hours a clear solution is obtained. By evaporation of this solution after dialysis the mixed polymerizate is obtained as a viscous oil. Inhibition (20γ/4 ccs.): 100%. After 10 days in aqueous solution the inhibition is unchanged. Also no decrease is observed by autoclaving (120° C., 20 minutes).

Example 21

1.1 g. of pyrocatechol are dissolved in 15 ccs. of anhydrous pyridine. The solution is cooled to −15° C., whereafter a solution of 0.65 cc. of phosphorus oxychloride in 5 ccs. of anhydrous pyridine is added with cooling and shaking. The mixture stands for 2 hours in a cooling bath and then for 15 hours at room temperature after which it is hydrolyzed. A clear solution results. Inhibition (200γ/4 ccs.): 0. By varying this experiment in different manners the same result is obtained, which was also to be expected.

Example 22

1.1 g. of p-phenylenediamine are dissolved in 20 ccs. of dioxan. 15 ccs. of dimethylaniline are added to the solution. The solution is cooled to −10° C., whereafter a solution of 0.65 cc. of phosphorus oxychloride in 10 ccs. of dimethylaniline is added with continued cooling and shaking. Time of addition: 3 minutes. The solution becomes turbid at once. After a further 2 minutes in the cooling bath it is hydrolyzed with finely crushed ice. The obtained solution is evaporated in vacuum, whereby a brownish oil is obtained. Inhibition (20γ/4 ccs.): 20%.

Example 23

1.1 g. of p-phenylenediamine are dissolved in 5 ccs. of quinoline. The solution is cooled to −15° C., whereafter a solution of 0.65 cc. of phosphorusoxychloride in 10 ccs. of quinoline is added with shaking. Time of addition: 3 minutes. After a further 1½ hours in the cooling bath a precipitate has formed. The mixture is then hydrolyzed with finely crushed ice. To the mixture 2 n sodium hydroxide is added till pH=10–11, whereafter the mixture is shaken up repeatedly with a mixture of ether and acetone (3:1). By evaporation of the aqueous solution a brown oil is obtained. Inhibition (20γ/4 ccs.): 56%.

Example 24

1.1 g. of p-aminophenol are dissolved in 15 ccs. of anhydrous pyridine. A solution of 0.65 cc. of phosphorus oxychloride in 5 ccs. of anhydrous pyridine is added with shaking. Time of addition: 2 minutes. The mixture is left standing in the cooling bath for 2 hours and then at room temperature for 15 hours whereafter a precipitate has formed. Then the mixture is hydrolyzed with finely crushed ice. After 96 hours a clear solution is obtained. By evaporation of this solution poly-p-aminophenyl phosphate is obtained as a viscous, light brown oil. Inhibition (20γ/4 ccs.): 75%.

Example 25

1.1 g. of m-aminophenol are dissolved in 15 ccs. of anhydrous pyridine. A solution of 0.65 cc. of phosphorus oxychloride in 10 ccs. of anhydrous pyridine is added dropwise at −10° C. with shaking. The mixture is left standing in a cooling bath for 2 hours and then for 15 hours at room temperature, whereafter a precipitate has formed. It is then hydrolyzed with finely crushed ice. After 96 hours at room temperature all has dissolved. The solution is evaporated in vacuum, whereby a dark brown oil is obtained. Inhibition (20γ/4 ccs.): 37%.

Example 26

2.2 g. of o-aminophenol are dissolved in 20 ccs. of anhydrous pyridine. At −10° C. a solution of 1.25 ccs. of phosphorus oxychloride in 10 ccs. of anhydrous pyridine are added dropwise with shaking. The mixture is left standing for 2 hours in the cooling bath and then for 15 hours at room temperature, whereafter a bulky precipitate has formed. By hydrolysis with finely crushed ice a clear solution is obtained. The substance, which is won by working up this solution, shows no inhibition in a concentration of 200γ/4 ccs. Several varying experiments gave the same result which was also to be expected.

Example 27

1.25 g. of p-methylaminophenol are dissolved in 15 ccs. of anhydrous pyridine. At −10° C. a solution of 0.65 cc. of phosphorus oxychloride in 5 ccs. of anhydrous pyridine is added dropwise with shaking. Time of addition: 2½ minutes. After the addition, during which it becomes red, the mixture is kept for 2 hours in a cooling bath and then for 15 hours at room temperature, whereafter it is hydrolyzed with finely crushed ice. Hereby a clear solution is obtained, which is evaporated in vacuum to yield a reddish oil. Inhibition (200γ/4 ccs.): 45%.

Example 28

1.25 g. of p-aminophenol are dissolved in 20 ccs. of anhydrous pyridine. At −10° C. a solution of 0.65 cc. of phosphorus oxychloride in 10 ccs. of anhydrous pyridine is added dropwise with shaking. Time of addition: 7 minutes. After ½ hour in the cooling bath all is solidified to a jelly-like mass. After further 1 hour the mass is hydrolyzed with finely crushed ice. After 144 hours at room temperature all is dissolved. By evaporation in vacuum an oil is obtained as usual. Inhibition (40γ/4 ccs.): 100%.

Example 29

3.1 g. of gentisic acid are dissolved in 20 ccs. of anhydrous pyridine. At −10° C. a solution of 1.3 ccs. of phosphorus oxychloride in 10 ccs. of anhydrous pyridine is added dropwise with shaking. Time of addition: 3½ minutes. After a further 5 minutes in the cooling bath the solution begins to become turbid. After a further ½ hour the mixture is hydrolyzed with finely crushed ice, whereby a clear solution is obtained. The solution is evaporated in vacuum, resulting in a viscous, light yellow oil. This is stirred with 25 ccs. of 2 n hydrochloric acid and saturated with common salt, whereby a viscous, soft mass is formed, which is dissolved in 25 ccs. of a saturated solution of sodium bicarbonate. The solution is poured into 25 ccs. of 2 n hydrochloric acid with stirring, whereby a white powder precipitates. This is removed by suction and dried over phosphorus pentoxide and potassium hydroxide. Yield 3.0 g. Inhibition (20γ/4 ccs.): 78%.

Example 30

1.25 g. of orcinol (containing 1 molecule water of crystallization) are dissolved in 15 ccs. of anhydrous pyridine. At −10° C. a solution of 1.0 cc. of phosphorus oxychloride in 5 ccs. of anhydrous pyridine is added dropwise. Time of addition: 2½ minutes. The mixture is kept in a cooling bath for 2 hours and at room temperature for 15 hours, whereafter it is hydrolyzed. Thereby a clear solution is obtained. By evaporation, an oil is obtained as usual. Inhibition (200γ/4 ccs.): 53%. If only 0.65 cc. of phosphorus oxychloride is used instead of 1.0 cc., a product is obtained, showing no inhibition.

Example 31

1.25 g. of orcinol (anhydrous) are dissolved in 15 ccs. of anhydrous pyridine. At −10° C. a solution of 0.65 cc. of phosphorus oxychloride in 5 ccs. of anhydrous pyridine is added dropwise. Time of addition: 2½ minutes. The mixture is kept for 2 hours in a cooling bath and for 15 hours at room temperature whereafter it is hydrolyzed. Thereby a clear solution is obtained. By evaporation, an oil is obtained as usual. Inhibition (20γ/4 ccs.): 77%.

Example 32

1.95 g. of hexylresorcinol are dissolved in 20 ccs. of anhydrous pyridine. At −10° C. a solution of 0.65 cc. of phosphorus oxychloride in 10 ccs. of anhydrous pyridine is added with shaking. Time of addition: 1½ minutes. The mixture is kept in a cooling bath for 2 hours and at room temperature for 15 hours whereafter it is hydrolyzed with finely crushed ice. Hereby a clear solution is obtained. A sample of the solution shows an inhibition of 100% with an amount of starting material corresponding to 40γ/4 ccs. The solution is evaporated in vacuum whereby a viscous colourless oil is obtained. The oil is dissolved in a mixture of 25 ccs. of acetone and 40 ccs. of 2 n sodium hydroxide. The solution becomes red. It is then acidified with 60 ccs. of 2 n hydrochloric acid whereby the solution becomes turbid, owing to precipitate oil drops. By shaking up with ether the oil, which consists of poly-hexylresorcinol phosphate, goes over to the ether layer. The ether solution is shaken up with a saturated solution of common salt, whereafter it is evaporated in vacuum whereby a viscous oil is obtained which is dried in vacuum over phosphorus pentoxide and potassium hydroxide. Yield: 2 g. of a viscous mass. 1.6 g. of this mass are dissolved in a mixture of 30 ccs. of 1 n sodium hydroxide and 50 ccs. of acetone and diluted with water to 100 ccs. 1 cc. of the thus obtained solution is diluted with water to 100 ccs. and tested. Inhibition (30γ/4 ccs.): 90%. After 7 days in aqueous solution at room temperature the inhibition is unchanged. The original solution is dialysed against flowing water. After 5 days of dialysis no active substance has been removed.

Example 33

1.15 g. of resorcinol-4-sulphonic acid are dissolved in 25 ccs. of anhydrous pyridine. The solution, which is to some extent turbid, is cooled to −10° C., whereafter a solution of 0.4 cc. of phosphorus oxychloride in 5 ccs. of anhydrous pyridine is added dropwise with shaking. Time of addition: 1½ minutes. The solution is kept for 2 hours in a cooling bath and for a further 15 hours at room temperature whereby a weak precipitate is formed. Now it is hydrolyzed with finely crushed ice. A clear solution is obtained, yielding a light brown oil by evaporation in vacuum. Inhibition (200γ/4 ccs.): 49%.

Example 34

0.8 g. of 4-nitroresorcinol are dissolved in 15 ccs. of anhydrous pyridine. At −10° C. a solution of 0.35 cc. of phosphorus oxychloride in 5 ccs. of anhydrous pyridine is added dropwise with shaking. Time of addition: 2 minutes. After 2 hours in a cooling bath and 15 hours at room temperature a dark brown, jelly-like mass has formed. This is now hydrolyzed with finely crushed ice whereby a clear solution is obtained. By evaporation in vacuum a dark brown oil is obtained. Inhibition (200γ/4 ccs.): 100%.

Example 35

1.55 g. of 2-nitroresorcinol are dissolved in 20 ccs. of anhydrous pyridine. The solution is cooled to −10° C. whereafter a solution of 0.65 cc. of phosphorus oxychloride in 10 ccs. of anhydrous pyridine is added dropwise with shaking. Time of addition: 3 minutes. Already after 1 minute a precipitate begins to form. The colour of the solution, which at the beginning is yellow, darkens by and by. At the end of the addition a heavy precipitate has formed. The mixture is then kept for 2 hours in a cooling bath whereby all solidifies to a semi-solid mass. After a further 15 hours at room temperature said mass is hydrolyzed with finely crushed ice. A clear solution is obtained. By testing of the solution, an inhibition of 100% is obtained with an amount of starting material corresponding to 20γ/4 ccs. The solution is evaporated in vacuum, whereby a viscous, dark red oil is obtained. This is dissolved in 20 ccs. of a saturated solution of sodium bicarbonate. After filtering off small amounts of undissolved substance the solution is poured out in 20 ccs. of 2 n hydrochloric acid, saturated with common salt. Thereby a viscous dark precipitate is formed. This is ground with anhydrous ether and dried in vacuum over phosphorus pentoxide and potassium hydroxide. Yield: 1.85 g. of a dark brown powder. 1 g. of this powder is dissolved in 5 ccs. of a saturated solution of sodium bicarbonate and diluted with water till 100 ccs. Inhibition (20γ/4 ccs.): 95%. After 7 days in aqueous solution at room temperature the inhibition is unchanged. The original solution is dialysed against flowing water. After several days of dialysis no active substance has been removed.

Example 36

0.32 g. of 4.6-dibromo-2-nitroresorcinol are dissolved in 15 ccs. of anhydrous pyridine, whereby a clear solution is obtained. This is cooled to −10° C., whereafter a solution of 0.07 cc. of phosphorus oxychloride in 5 ccs. of anhydrous pyridine is added dropwise with shaking. Time of addition: 1 minute. The colour of the solution darkens by and by. After 2 hours in a cooling bath the solution is almost black. After a further 15 hours at room temperature this is hydrolyzed with finely crushed ice, whereby a clear solution is obtained. By evaporation in vacuum a dark oil is obtained. Inhibition (5γ/4 ccs.): 100%.

Example 37

1.3 g. of pyrogallol are dissolved in 15 ccs. of anhydrous pyridine. At −10° C. a solution of 1.0 cc. of phosphorus oxychloride in 5 ccs. of anhydrous pyridine is added dropwise with shaking. Time of addition: 1½ minutes. Immediately after the addition has finished, the solution begins to become turbid. After 2 hours in a cooling bath a precipiate has formed at the bottom of the container. After a further 15 hours at room temperature the mixture is hydrolyzed with finely crushed ice, whereby a clear solution is obtained. By evaporation of the latter an oil is obtained as usual. Inhibition (200γ/4 ccs.): 100%. After 3 days in aqueous solution at room temperature the inhibition has decreased to 25%.

Example 38

1.25 g. of phloramine are dissolved in 15 ccs. of anhydrous pyridine. At −10° C. a solution of 1.0 cc. of phosphorus oxychloride in 10 ccs. of anhydrous pyridine is added dropwise with shaking. Time of addition: 3 minutes. After a further 25 minutes in a cooling bath the solution has become turbid and after further 1½ hours a copious precipitate has formed. Now this is hydrolyzed with finely crushed ice and after 96 hours at room temperature all has dissolved. The solution is very dark-coloured. It is evaporated in vacuum, whereby a viscous, dark oil is obtained. This oil is ground with 10 ccs. of hydrochloric acid, saturated with common salt, whereafter the residue is dissolved in 15 ccs. of a saturated solution is filtered and poured into 8 ccs. of 2 n hydrochloric acid, saturated with common salt. A dark grey powder is obtained which is dried over phosphorus pentoxide and potassium hydroxide. Inhibition (2γ/4 ccs.): 73%.

Example 39

2.5 g. of phloracetophenone are dissolved in 20 ccs. of anhydrous pyridine. At −10° C. a solution of 1.35 ccs. of phosphorus oxychloride in 5 ccs. of anhydrous pyridine is added dropwise with shaking. Time of addition: 5 minutes. Already during the addition a vigorous reaction takes place. After 1 hour in a cooling bath all has solidified to a semi-solid mass. After further ½ hour at room temperature the mixture is hydrolyzed with finely crushed ice. By evaporation in vacuum of the obtained solution an oil is obtained as usual. Inhibition (20γ/4 ccs.): 60%.

Example 40

1.3 g. of phloroglucin aldehyde (anhydrous) are dissolved in 150 ccs. of anhydrous pyridine. At −10° C. a solution of 0.8 cc. of phosphorus oxychloride in 10 ccs. of anhydrous pyridine is added dropwise with shaking. Time of addition: 4 minutes. Immediately after the addition the solution becomes turbid. It is kept for a further ½ hour in a cooling bath, whereafter it is hydrolyzed with finely crushed ice. After 24 hours at room temperature all is dissolved. The solution is evaporated in vacuum, yielding a viscous oil which is fairly soluble in water. Inhibition (200γ/4 ccs.): 82%.

Example 41

1.7 g. of gallic acid (anhydrous) are dissolved in 100 ccs. of anhydrous pyridine. At −15° C. a solution of 1 cc. of phosphorus oxychloride in 10 ccs. of anhydrous pyridine is added dropwise with shaking. Time of addition: 8 minutes. When all is added, the solution has become strongly turbid. After a further 15 minutes in a cooling bath a copious precipitate has formed so that the solution has become thick-flowing. After a further 5 hours in a cooling bath the mixture is hydrolyzed with finely crushed ice. After 24 hours at room temperature a clear solution has formed. By evaporation in vacuum a yellow-brown, viscous oil is obtained. The oil is difficultly soluble in water and dilute hydrochloric acid, easily soluble in a solution of sodium bicarbonate. Inhibition (30γ/4 ccs.): 75%. After 5 days in aqueous solution at room temperature the inhibition has decreased to 27%.

Example 42

2.1 g. of quinizarin are dissolved in 150 ccs. of anhydrous pyridine. The solution is cooled to −15° C., whereafter a solution of 1.5 ccs. of phosphorus oxychloride in 10 ccs. of anhydrous pyridine is added dropwise with shaking. Time of addition: 2 minutes. The mixture is kept in a cooling bath for 5 hours whereafter the dark-coloured solution is hydrolyzed with finely crushed ice. After 24 hours at room temperature an almost clear solution is obtained. By evaporation in vacuum a dark red oil is obtained which is difficultly soluble in a solution of sodium bicarbonate but easily soluble in sodium hydroxide, whereby the colour becomes dark violet. Inhibition (40γ/4 ccs.): 82%.

Example 43

2.32 g. of bis-(2,4-dihydroxyphenyl)-methane are dissolved in 20 ccs. of anhydrous pyridine. The solution is cooled to −13° C., whereafter a solution of 1.24 ccs. of phosphorus oxychloride in 5 ccs. of anhydrous pyridine is added with shaking and continued cooling. Time of addition: 4 minutes. A vigorous reaction takes place. After 2 minutes the solution becomes turbid but is again clear, when all is added. The solution is left for a further 2 hours in the cooling bath. At the end of this time the solution has become turbid and viscous. It is now hydrolyzed with finely crushed ice whereby a clear solution is obtained. To this 75 ccs. of 5 n hydrochloric acid are added whereby the polyphosphate precipitates as a viscous mass which is ground with a saturated solution of common salt and dried in an exsiccator in vacuum over phosphorus pentoxide. The substance is then obtained as a pink hygroscopic powder. Yield 2.5 g. Inhibition (20γ/4 ccs.): 83%.

Example 44

2.28 g. 4,4′-dihydroxy-diphenyl-dimethyl-methane are dissolved in 20 ccs. of anhydrous pyridine. At −15° C. a solution of 0.62 cc. phosphorus oxychloride in 5 ccs. of anhydrous pyridine is added dropwise with shaking. Time of addition: 3 minutes. By the addition an insignificant heating is observed. After 2 hours in a cooling bath a large amount of pyridinium chloride crystals have precipitated. The mixture is then kept at 0° C. during 15 hours, whereafter it has become viscous. It is then hydrolyzed with finely crushed ice, whereby a clear solution as well as a viscous mass is obtained. To the mixture 75 ccs. of 5 n hydrochloric acid are added, whereby a precipitate is formed in the clear solution, and the viscous mass becomes solid and distintegrates to a powder. The precipitate is filtered off and dissolved in 5 n solution of sodium hydroxide. After shaking up repeatedly with ether, hydrochloric acid in excess is added to the alkaline aqueous solution, whereby a white, finely grained precipitate is formed which is filtered off, washed with water and dried. Yield 3.2 g. White fine-grained powder, insoluble in a solution of sodium bicarbonate, soluble in sodium hydroxide solution. Inhibition (0.2γ/4 ccs.): 82%.

Example 45

2.14 g. of p,p′-dihydroxy-diphenyl-ethane are dissolved in 20 ccs. of anhydrous pyridine. At −15° C. a solution of 0.62 cc. of phosphorus oxychloride in 5 ccs. of anhydrous pyridine is added dropwise with shaking. Time of addition: 3 minutes. At the addition an insignificant heating takes place. After some hours in the cooling bath a copious precipitate of pyridinium chloride has formed. The mixture is then left for 15 hours at 0° C., whereafter its consistency is jelly-like. It is then hydrolyzed with finely crushed ice, whereby a clear solution is obtained. To this solution 75 ccs. of 5 n hydrochloric acid are added. Thereby a fine-grained precipitate is obtained which is removed by suction, washed with water and dried in an exsiccator over phosphorus pentoxide.

Almost white powder, yield 2 g. The product is difficultly soluble in a solution of sodium bicarbonate but easily soluble in a solution of sodium hydroxide. Inhibition (20γ/4 ccs.): 93%.

Example 46

2.12 g. of 4,4'-diaminodiphenyl-ethane are dissolved in 15 ccs. of anhydrous pyridine. The solution is cooled to −15° C., whereafter a solution of 0.62 cc. of phosphorus oxychloride in 5 ccs. of anhydrous pyridine is added dropwise with shaking. Time of addition: 4 minutes. During the addition a vigorous reaction takes place, whereby the temperature increases several degrees in spite of the cooling. After 2 minutes the solution begins to become turbid, and a viscous precipitate is formed on the walls of the container. After ½ hour it is hydrolyzed with finely crushed ice. The already formed precipitate does not dissolve owing to the polymerization having gone too far. The undissolved material is filtered off, whereafter hydrochloric acid is added to the clear solution, a bulky precipitate being obtained. This is removed by centrifuging, washed and dried in a vacuum exsiccator. 0.75 g. of a yellow-brown powder is obtained. This powder is difficultly soluble in sodium hydroxide. Inhibition (20γ/4 ccs.): 75%.

Example 47

2.88 g. of 2,2'-diamino - 4,4'- dinitro-diphenyl-methane are dissolved in 50 ccs. of anhydrous pyridine. At −12° C. a solution of 0.62 cc. of phosphorus oxychloride in 5 ccs. of anhydrous pyridine is added with shaking. After the addition the solution is kept for 7 days at room temperature. During this time no changes are observed. Then the solution is heated for 1 hour to 100° C. After cooling it is hydrolyzed with finely crushed ice, whereby a yellow precipitate is formed. 5 n hydrochloric acid is added to acid reaction with Congo red, whereby the amount of the precipitate is increased. The precipitate is extracted by stirring with sodium hydroxide. The solution is acidified with hydrochloric acid, whereby a light yellow, flocky precipitate is obtained. Amount 1.5 g. Inhibition (200γ/4 ccs.): 67%.

Example 48

1.84 g. of p-aminodiphenylamin are dissolved in 25 ccs. of anhydrous quinoline. A very dark solution is obtained, to which a solution of 0.62 cc. of phosphorus oxychloride in 5 ccs. of anhydrous quinoline is added at −12° C. Time of addition: 2½ minutes. After 10 minutes the mixture begins to become viscous. After 5 hours it is hydrolyzed with finely crushed ice and acidified with 5 n hydrochloric acid. A yellow-black precipitate is obtained which is removed by suction and washed with water. Amount 3.5 g. The precipitate is very difficulty soluble but may be dissolved by shaking with 2 n sodium hydroxide for some time. Inhibition (200γ/4 ccs.): 50%.

Example 49

1.1 g. of benzidine are dissolved in a mixture of 25 ccs. of anhydrous ether and 25 ccs. of anhydrous acetone, whereafter 100 ccs. of anhydrous quinoline are added. A solution of 0.37 cc. of phosphorus oxychloride in 5 ccs. of anhydrous quinoline is added at −10° C. with shaking. The solution is left for 1 hour in a cooling bath and then for 7 days at room temperature whereby no visible change is observed. It is now hydrolyzed with finely crushed ice, whereafter 2 n sodium hydroxide is added to pH=12. Then the quinoline is removed by shaking up with ether. The aqueous solution is evaporated in vacuum, whereby a viscous oil is obtained. Inhibition (100γ/4 ccs.): 50%.

Example 50

Proportions as in Example 10. Time of addition: 7½ minutes. The colourless solution, which is obtained as in Example 10 is analyzed and no inorganic phosphorus is found. Inhibition (calculated on 20γ starting material, in this case hydroquinone, per 4 ccs.): 100%. The pH of the solution is adjusted at 7 with sodium bicarbonate whereafter the solution is divided in two parts. One is left standing, whereas the other is dialyzed against flowing water for 5 days. After this time, the former solution still does not contain inorganic phosphorus, and the inhibition, as determined above, has decreased to 70%. In the dialyzed solution 90% of the original phosphorus contents are found and the inhibition is 70% also in this case (starting material 20γ/4 ccs.).

This experiment shows that the main part of the hydroquinone is present as a high molecular, nondialyzable polyhydroquinone phosphate and that anti-enzymatic effect is inherent with the non-dialyzable fraction.

Example 51

Proportions as in Example 10. The addition commences at a temperature of 25° C. Time of addition: 3½ minutes. During the addition the temperature increases to about 50° C. Just after the addition a copious precipitate of pyridinium chloride is formed. After a further 15 minutes the temperature has decreased to about 35° C. and the mixture has solidified to a jelly-like mass which after a further 15 minutes is hydrolyzed with finely crushed ice. After 24 hours a clear, colourless solution is obtained which after evaporation in vacuum yields a light yellow oil. Inhibition (20γ/4 ccs.): 100%.

Example 52

2.2 g. of hydroquinone are dissolved in 20 ccs. of anhydrous pyridine. At −5° C. a solution of 3.8 ccs. of phosphorus oxychloride in 10 ccs. of anhydrous pyridine is added with shaking. Time of addition: 2 minutes. Just after the addition a copious precipitation of pyridinium chloride takes place. The solution is left to stand for 1 hour in a cooling bath and then for 15 hours at room temperature, whereafter it is hydrolyzed with finely crushed ice. A clear solution is obtained. By evaporation in vacuum a light yellow oil is obtained. Inhibition (200γ/4 ccs.): 0.

Example 53

2.6 g. of phloroglucinol are dissolved in 20 ccs. of anhydrous pyridine. At −5° C. a solution of 5.7 ccs. of phosphorus oxychloride in 10 ccs. of anhydrous pyridine is added dropwise with shaking. Time of addition: 4 minutes. After a further 15 minutes in a cooling bath the mixture has solidified to a semi-solid mass. After a further 45 minutes in the cooling bath and then at room temperature for 15 hours the mixture is hydrolyzed with finely crushed ice, whereby an almost clear solution is obtained. By evaporation in vacuum an oil is obtained. Inhibition (200γ/4 ccs.): 40%. If the same experiment is carried out with 7.6 ccs. of phosphorus oxychloride, the inhibition (200γ/4 ccs.) is 0.

Example 54

0.8 g. of naphtho-resorcinol are dissolved in 15 ccs. of anhydrous pyridine. The solution is cooled to −10° C., whereafter a solution of 0.5 cc. of phosphorus oxychloride in 5 ccs. of anhydrous pyridine is added with shaking and cooling. Time of addition: 5 minutes. The colour of the solution, which at the beginning is dark brown, brightens by and by. After the addition the solution is left to stand for 1 hour in a cooling bath and then for 15 hours at room temperature. Then it is hydrolyzed with finely crushed ice whereby a clear solution is obtained. The solution is evaporated in vacuum whereby a brown oil is obtained. Inhibition (20γ/4 ccs.): 77%.

Example 55

1.6 g of 1,5-dihydroxynaphthaline are dissolved in 20 ccs. of anhydrous pyridine. At −10° C. a solution of 1.0 cc. of phosphorus oxychloride in 10 ccs. of anhydrous pyridine is added with shaking. Time of addition: 3 minutes. Then the solution is left to stand for 1 hour in a cooling bath and then for 15 hours at room temperature whereby an insignificant precipitate is formed. After hydrolysis with finely crushed ice a clear solution is obtained. By evaporation in vacuum an oil is obtained. Inhibition (20γ/4 ccs.): 100%.

Example 56

1.75 g. of 2-methylnaphtho-hydroquinone are dissolved in 20 ccs. of anhydrous pyridine. The solution is cooled to −10° C., whereafter a solution of 1.0 cc. of phosphorus oxychloride in 10 ccs. anhydrous pyridine is added with continued cooling and shaking. Time of addition: 8 minutes. The colour of the solution, which begins with being dark red, changes during the addition to light yellow. After the addition the solution is left to stand for 1 hour in the cooling bath and then for 15 hours at room temperature, whereby no visible change is observed. Then it is hydrolyzed with finely crushed ice, whereby a clear solution is obtained. This is evaporated in vacuum, yielding an oil showing an inhibition (20γ/4 ccs.) of 100%.

Example 57

1.3 g. of 1,2,7-trihydroxyanthraquinone are dissolved in 30 ccs. of anhydrous pyridine. At −15° C. a solution of 0.7 cc. of phosphorus oxychloride in 5 ccs. of anhydrous pyridine is added with shaking. Time of addition: 3 minutes. After the addition the still dark solution is kept for 1 hour in the cooling bath whereby a precipitate is formed. After a further 15 hours at room temperature it is hydrolyzed with finely crushed ice, whereby all is dissolved. The solution is evaporated in vacuum. The inhibition of the obtained oil (20γ/4 ccs.) is 95%.

Example 58

1.3 g. of p-nitrobenzeneazo-resorcinol are dissolved in 35 ccs. of anhydrous pyridine. At −10° C. a solution of 0.5 cc. of phosphorus oxychloride in 5 ccs. of anhydrous pyridine is added with shaking. The still dark solution is kept for 1 hour in the cooling bath and then for 15 hours at room temperature after which period no visible change is observed. Then it is hydrolyzed with finely crushed ice to form a clear solution. This is evaporated in vacuum. The obtained oil shows an inhibition (20γ/4 ccs.) of 44%.

Example 59

1.98 g. of 4,4′-diaminodiphenyl-methane are dissolved in 25 ccs. of anhydrous quinoline. At −12° C. a solution of 0.62 cc. of phosphorus oxychloride in 5 ccs. of anhydrous pyridine is added with shaking. After 15 minutes in the cooling bath the solution has become thick-flowing. Then it is hydrolyzed with finely crushed ice, whereby it is divided in two layers. 5 n hydrochloric acid is added to acid reaction with Congo red, whereby the quinoline dissolves and a viscous jelly-like mass precipitates. Inhibition (150γ/4 ccs.): 92%.

Example 60

1.33 g. of 4,4′-dihydroxy-β-δ-diphenyl-γ-δ-hexadiene are dissolved in 20 ccs. of anhydrous pyridine. The solution is cooled to −14° C., whereafter a solution of 0.31 cc. of phosphorus oxychloride in 5 ccs. of anhydrous pyridine is added dropwise with shaking. Time of addition: 3 minutes. At the addition an insignificant heating occurs. The mixture is left for a further 3 hours in the cooling bath and then for 20 hours at 0° C. After this time the mixture has become jelly-like. It is then hydrolyzed with finely crushed ice, whereby a clear solution is obtained. To this solution 75 ccs. of 5 n hydrochloric acid are added, whereby after drying 1.6 g. of a light beige powder is obtained. This product is difficultly soluble in a solution of sodium bicarbonate but easily soluble in sodium hydroxide. Inhibition (20γ/4 ccs.): 95%.

Example 61

2.48 g. of 4,4′-diaminodiphenylsulphone are dissolved in 15 ccs. of anhydrous pyridine. At −12° C. a solution of 0.62 cc. of phosphorus oxychloride in 5 ccs. of anhydrous pyridine is added dropwise with shaking. Time of addition: 5 minutes. After about 1 hour in a cooling bath the solution has become turbid. It is then hydrolyzed with finely crushed ice, whereby a clear solution is obtained. To this 75 ccs. of 5 n hydrochloric acid are added, whereby a reddish powder precipitates which is removed by suction and washed with dilute hydrochloric acid, whereafter it is dried in a vacuum exsiccator over phosphorus pentoxide and potassium hydroxide. Yield: 2.5 g. of a pink powder, which is undissolvable in a solution of sodium bicarbonate, but easily soluble in sodium hydroxide. Inhibition (20γ/4 ccs.): 79%.

Example 62

1.22 g. of 2,4,4′,6-tetrahydroxybenzophenone are dissolved in 15 ccs. of anhydrous pyridine. At −10° C. a solution of 0.47 cc. of phosphorus oxychloride in 5 ccs. of anhydrous pyridine is added dropwise. Time of addition: 5 minutes. Just after the addition the solution becomes turbid and a fine-grained yellow precipitate begins to form. After a further 45 minutes in the cooling bath the mixture is hydrolyzed with finely crushed ice. After 1 hour at room temperature all has dissolved. The clear solution is evaporated in vacuum, whereby a yellow-brown oil is obtained. This is dissolved in a solution of sodium bicarbonate and shaken up repeatedly with ether. To the aqueous solution 2 n hydrochloric acid is added, and the solution is saturated with common salt. Thereby a red-brown viscous mass precipitates which is ground with a mixture of acetone and ether in a mortar. Hereby a powder is obtained, which after drying is red-brown. Amount: 0.9 g. The substance is quite easily soluble in water. Inhibition (20γ/4 ccs.): 100%. Inhibition (2γ/4 ccs.): 38%.

Example 63

A mixture of 22 g. of hydroquinone and 19.2 ml. of phosphorus oxychloride is heated in a flask provided with a refluxer and a calcium chloride tube. The temperature is slowly raised, whereby the hydroquinone dissolves. At 110° C. an evolution of hydrogen chloride starts, and the temperature is slowly raised to 200° C. during 6 hours and kept there for a further ½ hour, whereafter the evolution of hydrogen chloride is finished. After cooling, the viscous product is poured onto ice and left standing for 1 hour while stirring. Under continued stirring, sodium bicarbonate is added until pH is 7, whereby a clear colourless solution is obtained. Concentrated hydrochloric acid is added in excess, whereby a colourless oil is separated. This oil is washed with 5 normal hydrochloric acid and dried in vacuum over phosphorus pentoxide and sodium hydroxide. The yield is 25 g. of a viscous colourless product which is hygroscopic and soluble in water. The inhibition of the substance (200γ/4 ml.) is 80%.

Example 64

A mixture of 22 g. of resorcinol and 19.2 ml. of phosphorus oxychloride is heated as in the previous example, whereby a clear red solution is obtained. Evolution of hydrogen chloride starts at 130° C., and the temperature is raised to 170° C. in the course of 2 hours and kept at this point for 12 hours. The reaction mixture is worked up as described in the previous example. The yield is 21 g. of a viscous yellow-brown product which is hygroscopic and soluble in water. The inhibition (200γ/4 ml.) is 70%.

Example 65

25.2 g. of phloroglucinol are mixed with 27 ml. of phosphorus oxychloride, whereby a violent reaction and evolution of heat and hydrogen chloride is immediately observed. When the evolution of hydrogen chloride slows down, the mixture is heated to 130° C. in the course of 2 hours and kept at this temperature for 1 hour. Then the mixture has solidified, and the evolution of hydrogen chloride has stopped. After cooling, the reaction mass is hydrolyzed with ice and the precipitated solid substance is ground with water in a mortar. A red powder is obtained which is washed by centrifuging, first with water, then with acetone and finally with ether. The yield is 42 g. of a red powder which is insoluble in all usual solvents. An analysis shows a moisture content of 28% and a phosphorus content of 16.6%, calculated on a dried sample.

The insoluble condensation product may be transformed into soluble polyphloroglucinol phosphate by hydrolysis. 5 g. are boiled with 100 ml. of 0.1 normal hydrochloric acid with refluxing. After 6 hours' boiling a clear solution is formed which is neutralized with 2 normal sodium hydroxide solution and dialyzed. After evaporation in vacuum the sodium salt is obtained as a hygroscopic powder. The yield is 2 g. and the inhibition (20γ/4 ml.) is 80%.

*Example 66*

12.6 g. of phloroglucinol, 50 ml. of dioxan and 13.5 ml. of phosphorus oxychloride are heated for 5 hours on the steam bath with refluxing, whereafter the evolution of hydrogen chloride is complete. On cooling, the reaction mixture solidifies to a red-coloured gel. This is hydrolyzed with ice and heated for some minutes on the steam bath, whereby a clear solution is obtained. This solution is neutralized with 2 normal sodium hydroxide solution to pH 7 and then dialyzed. After evaporation in vacuum, the sodium salt of polyphloroglucinol phosphate is obtained as a hygroscopic powder. The yield is 14.5 g. and the inhibition (10γ/4 ml.) is 65%.

We claim:

1. A compound selected from the group consisting of a antienzymatic phosphorylation product of aromatic compounds and the salts of said products, the aromatic compounds being selected from the class consisting of (1) mononuclear aromatic compounds,
(2) dinuclear aromatic compounds, the nuclei of which are directly interconnected,
(3) polynuclear aromatic compounds with not more than three condensed aromatic nuclei,
(4) dinuclear aromatic compounds with two aromatic nuclei interconnected through a bridge consisting of not more than one atom selected from the group consisting of carbon, oxygen, sulphur and nitrogen and not more than one additional carbon atom, each of said aromatic compounds containing at least two non-adjacent reactive groups selected from the class consisting of —OH, —SH and —''NHR radicals where R is selected from the group consisting of hydrogen, methyl and phenyl directly attached to an aromatic nucleus, said antienzymatic, phosphorylation product consisting of organic radicals alternating with and linked together by phosphoric acid radicals

where X is an atom of the group consisting of oxygen and sulphur, each of the said organic radicals being a molecule of one of said aromatic compounds in which a hydrogen atom of at least one of said reactive groups is absent, the remaining atom of each such group being linked directly, in the said phosphorylation product, to a phosphorus atom of one of the said phosphoric acid radicals, each of the remaining linkings of which phosphorus atom is linked to a radical selected from the class consisting of said organic radicals and hydroxyl, said antienzymatic phosphorylation product, containing hydroxyl groups linked to phosphorus, having a molecular weight exceeding 2000 and being soluble in aqueous alkali.

2. A substance of claim 1 in which the said organic radicals in a single molecule are of different kinds.

3. A substance of claim 1 in which the said organic radicals are phenolic from phenols of not more than 4 phenolic hydroxyl groups.

4. A substance of claim 1, in which the said organic radicals are thiophenolic radicals from thiophenols of not more than 4 thiophenolic SH groups.

5. A substance of claim 1, in which the said organic radicals are aromatic amino from aromatic amines with not more than 4 nuclear amino groups.

6. Antienzymatic substance derived from the reaction between a phosphorylation agent selected from the class consisting of phosphorus oxyhalides and thiophosphoryl halides and an aromatic compound selected from the class consisting of (1) mononuclear aromatic compounds,
(2) dinuclear aromatic compounds, the nuclei of which are directly interconnected,
(3) polynuclear aromatic compounds with not more than three condensed aromatic nuclei,
(4) dinuclear aromatic compounds with two aromatic nuclei interconnected through a bridge consisting of not more than one atom selected from the group consisting of carbon, oxygen, sulphur and nitrogen and not more than one additional carbon atom, each of said aromatic compounds containing at least two non-adjacent reactive groups selected from the class consisting of —OH, —SH and —NH— radicals attached to an aromatic nucleus, the reactants being reacted in substantially equimolecular proportions, and the reaction product being hydrolyzed to yield an antienzymatic substance having a molecular weight exceeding 2000 and containing hydroxyl groups linked to phosphorus and being soluble in aqueous alkali.

7. A method of producing antienzymatic phosphorylation products of aromatic compounds selected from the class consisting of (1) mononuclear aromatic compounds,
(2) dinuclear aromatic compounds, the nuclei of which are directly interconnected,
(3) polynuclear aromatic compounds with not more than three condensed aromatic nuclei,
(4) dinuclear aromatic compounds with two aromatic nuclei interconnected through a bridge consisting of not more than one atom selected from the group consisting of carbon, oxygen, sulphur and nitrogen and not more than one additional carbon atom, each of said aromatic compounds containing at least two non-adjacent reactive groups selected from the class consisting of —OH, —SH and —''NHR radicals where R is selected from the group consisting of hydrogen, methyl and phenyl directly attached to an aromatic nucleus, said antienzymatic phosphorylation product consisting of organic radicals alternating with and linked together by phosphoric acid radicals

where X is an atom of the group consisting of oxygen and sulphur, each of the said organic radicals being a molecule of one of said aromatic compounds in which a hydrogen atom of at least one of said reactive groups is absent, the remaining atom of each such group being linked directly, in the said phosphorylation product, to a phosphorus atom of one of the said phosphoric acid radicals, each of the remaining linkings of which phosphorus atom is linked to a radical selected from the class consisting of said organic radicals and hydroxyl, which method comprises reacting an aromatic compound as defined above with a phosphorylating agent selected from the group consisting of phosphorus oxyhalides, and thiophosphoryl halides in substantially equimolecular proportions in the presence of a hydrogen halide binding agent, the reaction being continued until a phosphorylation product is formed having a molecular weight above 2000, and hydrolyzing to remove non-reacted halogen atoms linked to the phosphorus atoms of the phosphorylation product and to reduce any non-alkali-soluble part of the phosphorylation product to a molecular size which makes the product alkali-soluble.

References Cited in the file of this patent

UNITED STATES PATENTS

| | | |
|---|---|---|
| 2,058,394 | Arvin | Oct. 27, 1936 |
| 2,272,668 | Honel | Feb. 10, 1942 |
| 2,435,252 | Toy | Feb. 3, 1948 |
| 2,612,488 | Nelson | Sept. 30, 1952 |
| 2,636,876 | Zenftman et al. | Apr. 28, 1953 |
| 2,674,590 | Zenftman | Apr. 6, 1954 |

FOREIGN PATENTS

| | | |
|---|---|---|
| 644,468 | Great Britain | Oct. 11, 1950 |

OTHER REFERENCES

Wright et al.: Chemistry and Industry, March 15, 1952, page 244.